(12) United States Patent
Flens et al.

(10) Patent No.: US 9,348,102 B2
(45) Date of Patent: May 24, 2016

(54) PIN CADENCE FOR HIGH-SPEED CONNECTORS

(71) Applicant: FINISAR CORPORATION, Sunnyvale, CA (US)

(72) Inventors: Frank Flens, Campbell, CA (US); Daniel Kossowski, Santa Clara, CA (US); William H. Wang, Pleasanton, CA (US); Michael Joseph McReynolds, Jr., San Mateo, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 156 days.

(21) Appl. No.: 14/095,958

(22) Filed: Dec. 3, 2013

(65) Prior Publication Data

US 2014/0178014 A1 Jun. 26, 2014

Related U.S. Application Data

(60) Provisional application No. 61/732,886, filed on Dec. 3, 2012, provisional application No. 61/732,861, filed on Dec. 3, 2012, provisional application No. 61/732,868, filed on Dec. 3, 2012.

(51) Int. Cl.
*G02B 6/42* (2006.01)
*G02B 6/43* (2006.01)
*G02B 6/12* (2006.01)
*H01R 13/6471* (2011.01)

(52) U.S. Cl.
CPC .............. *G02B 6/43* (2013.01); *G02B 6/12004* (2013.01); *G02B 6/4284* (2013.01); *H01R 13/6471* (2013.01); *G02B 6/4206* (2013.01); *G02B 6/4214* (2013.01); *G02B 6/4269* (2013.01)

(58) Field of Classification Search
CPC ..... G02B 6/12004; G02B 6/4284; G02B 6/43
USPC .......................................................... 385/88
See application file for complete search history.

(56) References Cited

U.S. PATENT DOCUMENTS

| 6,499,890 | B2* | 12/2002 | Gilliland et al. ................ 385/88 |
| 7,215,883 | B1* | 5/2007 | Lewis .............................. 398/25 |
| 2007/0288679 | A1* | 12/2007 | Dreps et al. ................... 710/310 |
| 2008/0098277 | A1* | 4/2008 | Hazelzet ........................ 714/753 |
| 2008/0256281 | A1* | 10/2008 | Fahr et al. ..................... 710/305 |
| 2010/0111468 | A1* | 5/2010 | Funabashi et al. .............. 385/14 |
| 2011/0110631 | A1* | 5/2011 | Baker et al. ..................... 385/88 |
| 2012/0210784 | A1* | 8/2012 | Kokkoneva et al. ............ 73/431 |

* cited by examiner

Primary Examiner — Thomas A Hollweg
Assistant Examiner — Mary A El Shammaa
(74) Attorney, Agent, or Firm — Maschoff Brennan

(57) ABSTRACT

A connector includes pins having a pinout including a functional designation cadence. The functional designation cadence includes a first ground pin, a first signal pin, a no-connect pin, a second signal pin, and a second ground pin, where the first signal pin is positioned between the first ground pin and the no-connect pin, the no-connect pin is positioned between the first and second signal pins, and the second signal pin is positioned between the no-connect pin and the second ground pin. Alternately, the functional designation cadence includes a first ground pin, a first signal pin, a third ground pin, a second signal pin, and a second ground pin, where the first signal pin is positioned between the first and third ground pins, the third ground pin is positioned between the first and second signal pins, and the second signal pin is positioned between the third and second ground pins.

20 Claims, 5 Drawing Sheets

US 9,348,102 B2

PIN CADENCE FOR HIGH-SPEED CONNECTORS

CROSS-REFERENCE TO RELATED APPLICATIONS

This patent application claims the benefit of and priority to U.S. Provisional Application No. 61/732,886, filed Dec. 3, 2012, to U.S. Provisional Application No. 61/732,861, filed Dec. 3, 2012, and to U.S. Provisional Application No. 61/732,868, filed Dec. 3, 2012. The foregoing provisional applications are incorporated herein by reference.

FIELD

The embodiments discussed herein relate to connectors with pins. More particularly, some example embodiments relate to pins in a connector that have a repeating functional designation cadence.

BACKGROUND

Optical cables can be implemented in applications in which data is communicated between host systems. For example, a first host system may transmit data to a second host system via the optical cable. Optical connectors may be attached to the ends of the optical cable to provide a mechanical coupling between the ends of the optical cable and the corresponding host systems. The optical connectors generally include a set of pins that interface with complementary pins or receivers in a receiver of the host system.

Dimensions of optical connectors are decreasing in size while at the same time the amount of data communicated through the optical connectors is increasing. In some designs, the reduction in size dictates relative positions of components included in the optical connectors. The relative positions may reduce the ability to reliably transfer data through the optical connectors.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Embodiments relate to connectors with pins. More particularly, some example embodiments relate to pins in a connector that have a repeating functional designation cadence.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, a connector includes multiple pins having a pinout including at least one functional designation cadence. The functional designation cadence may include a first ground pin, a first signal pin, a no-connect pin, a second signal pin, and a second ground pin, where the first signal pin is positioned between the first ground pin and the no-connect pin, the no-connect pin is positioned between the first signal pin and the second signal pin, and the second signal pin is positioned between the no-connect pin and the second ground pin. Alternately, the functional designation cadence may include a first ground pin, a first signal pin, a third ground pin, a second signal pin, and a second ground pin, where the first signal pin is positioned between the first ground pin and the third ground pin, the third ground pin is positioned between the first signal pin and the second signal pin, and the second signal pin is positioned between the third ground pin and the second ground pin.

Additional features and advantages will be set forth in the description which follows, and in part will be obvious from the description, or may be learned by the practice of the embodiments. The features and advantages of the embodiments will be realized and obtained by means of the instruments and combinations particularly pointed out in the claims. These and other features will become more fully apparent from the following description and claims, or may be learned by the practice of the embodiments as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only some embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Some example embodiments described herein include a connector with multiple pins. In a particular embodiment, the pins may include fort-one pins. More generally, the pins include a repeating functional designation cadence. The functional designation cadence may include a first ground pin, a first signal pin, a third ground pin, a second signal pin, and a second ground pin. By separating the first signal pin and the second signal pin with the third ground pin, the impedance between the first signal pin and the second signal pin may be maintained and the signal integrity may be improved relative to at least some other designs. The pins of the connector may additionally include two power pins, which have a shorter length than the other pins. Each of the pins may define two openings configured to reduce parasitic capacitance imposed by the pins.

Reference will now be made to the figures wherein like structures will be provided with like reference designations. The drawings are diagrammatic and schematic representations of exemplary embodiments and, accordingly, are not limiting of the scope of the claimed subject matter, nor are the drawings necessarily drawn to scale.

Figure 1A:
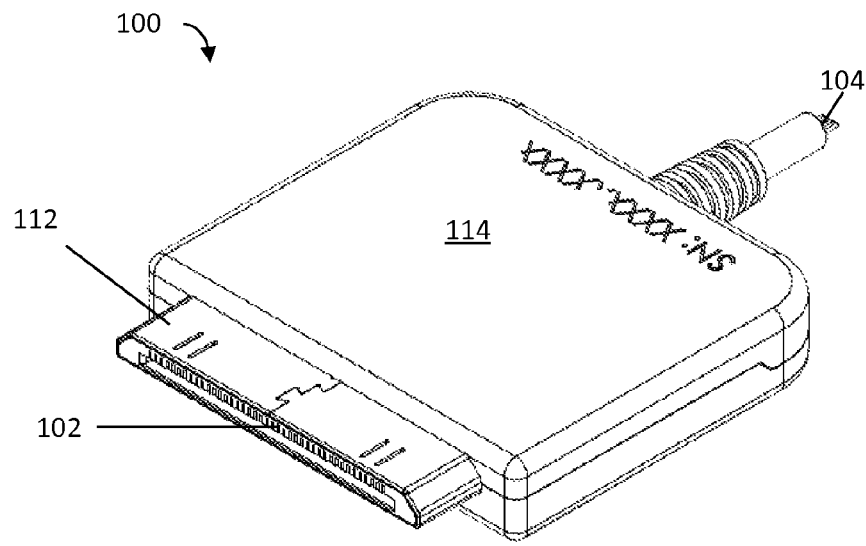
FIGS. 1A and 1B illustrate an optoelectronic connector (hereinafter "connector") in which some embodiments disclosed herein may be implemented.
Figure 1B:
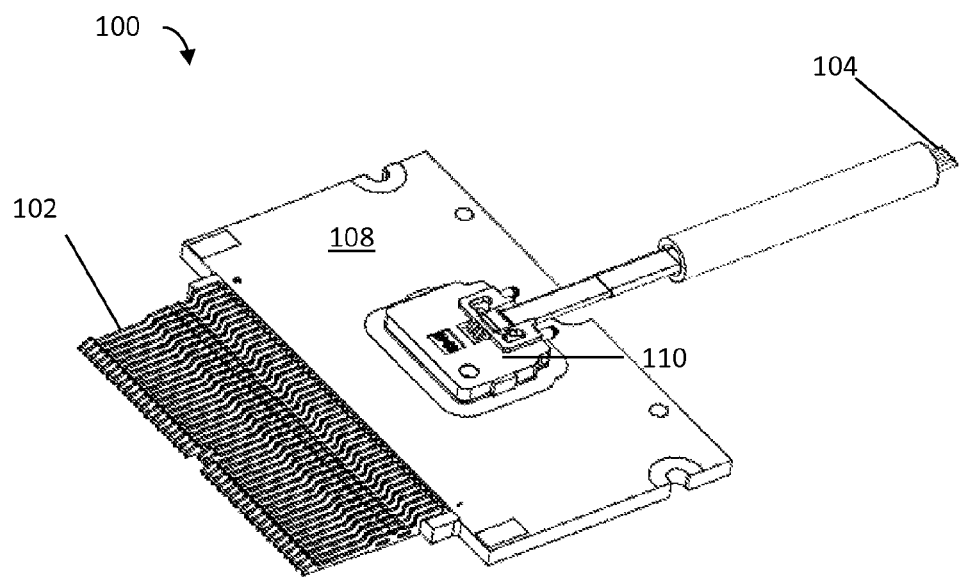

FIGS. 1A and 1B illustrates an optoelectronic connector 100 (hereinafter "connector 100") in which some embodiments disclosed herein may be implemented. FIG. 1A depicts a perspective view of the connector 100. The connector 100 may include a connector housing 114, an electromagnetic radiation shield 112 (hereinafter "EMR shield 112"), and multiple pins 102 at least partially surrounded by the EMR shield 112. FIG. 1B depicts the connector 100 with the connector housing 114 and the EMR shield 112 removed to make visible some internal components (e.g. 110 and 108) of the connector 100. As illustrated in FIGS. 1A and 1B, the connector 100 may be coupled to an end of an optical cable that includes a set of one or more optical fibers 104.

Generally, the connector 100 is configured to receive, convert, and communicate high-speed data (e.g. 10 gigabits/second or higher per channel) between the pins 102 and the optical fibers 104. The pins 102 may be composed of an electrically conductive material and may be configured to receive data in the form of electrical signals from a host system (not shown) to which the connector 100 may be coupled. The pins 102 may communicate the electrical signals to a printed circuit board (PCB) 108 (FIG. 1B) of the connector 100. The PCB 108 generally includes one or more contacts (not shown) and one or more electrical traces (not shown) that electrically couple the pins 102 to optical components (not shown) positioned within and/or under a lens assembly 110 of the connector 100. The optical components may be configured to convert the electrical signals to the optical domain and to transmit the data, now in the form of optical signals representative of the electrical signals, into one or more of the optical fibers 104. In this described function (e.g., receiving electrical signals from the host system and converting to optical signals) of the connector 100, the optical components may include an optical transmitter, such as a vertical-cavity surface-emitting laser (VCSEL). Alternately or additionally, the connector 100 may include at least one laser driver configured to drive at least one corresponding optical transmitter to emit an optical signal representative of a corresponding one of the electrical signals received from the host system.

Additionally, the connector 100 can receive data in the form of optical signals that are transmitted along the optical fibers 104 from an end of the optical fibers 104 that is opposite the end of the optical fibers 104 in FIGS. 1A and 1B. The optical signals may be communicated to one or more optical components positioned within and/or under the lens assembly 110. The optical components may be configured to convert the optical signals to electrical signals that are communicated along one or more of the electrical traces to one or more of the contacts on the PCB 108 and then to one or more of the pins 102. In this described function (e.g., receiving optical signals and converting to electrical signals), the optical components may include at least one optical receiver such as a PIN photodiode or another optical component capable of receiving an optical signal and generating a representative electrical signal therefrom.

The EMR shield 112 may surround the pins 102 such that electromagnetic radiation (EMR) that may be generated through the communication of high-speed data by the connector 100 may be contained within the connector 100. For example, the EMR shield 112 may absorb or receive EMR and subsequently ground the EMR such that any electromagnetic interference (EMI) may be attenuated and/or otherwise at least partially prevented from escaping the connector 100. Accordingly, the EMR shield 112 may at least partially reduce EMI exiting the connector 100 into a surrounding system, such as a host system. In some embodiments, the EMR shield 112 may be composed of a metal for efficient conduction of the EMR.

In the depicted embodiment, the optical fibers 104 are substantially oriented parallel to the pins 102. However, this is not meant to be limiting. In some embodiments, the optical fibers 104 are oriented normal to the pins 102. In embodiments in which the optical fibers 104 are oriented normal to the pins 102, the electrical trace on the PCB 108 may have different designs but otherwise equivalent function.

The connector 100 is configured to be received by and mechanically and communicatively coupled to a host connector (not shown). The host connector may be integrated within a host system such as a television, a monitor, a media box, or another suitable computing device. The host connector may be configured to correspond and be complementary to the connector 100. Specifically, in the following example functional designation cadence of the pins 102, a host connector may include pins with a complementary functional designation cadence such that data may be communicated from the host system to the connector 100 and/or from the connector 100 to the host system via the host connector.

In the connector 100, the pins 102 may be arranged according to a pinout. Generally, the pinout refers to a functional description of each of the pins 102 and/or the corresponding contacts on the PCB 108 and/or a host system to which the pins 102 are electrically coupled. Several advantages may be obtained by using a particular pinout. For example, during the communication of high-speed data, impedance between adjacent signal pins may drop when the signal pins are positioned within a minimum distance of each other. That is, the signal pins may be too close together, which may create capacitance between the signal pins and a corresponding loss of or reduction in impedance. The loss of or reduction in impedance may prevent high-speed data from being communicated using the signal pins and/or may degrade high-speed data communicated using the signal pins. Accordingly, some embodiments described herein may separate the signal pins to maintain a desired impedance. However, a difficulty may arise during a manufacturing process of the connector 100 with inconsistent separation distances between pins 102. Alternately or additionally, a pitch between the pins 102 may be constant due to a paddle used in automated manufacturing processes. Thus, it may present a cost advantage to maintain a constant pitch between the pins 102.

Figure 2A:
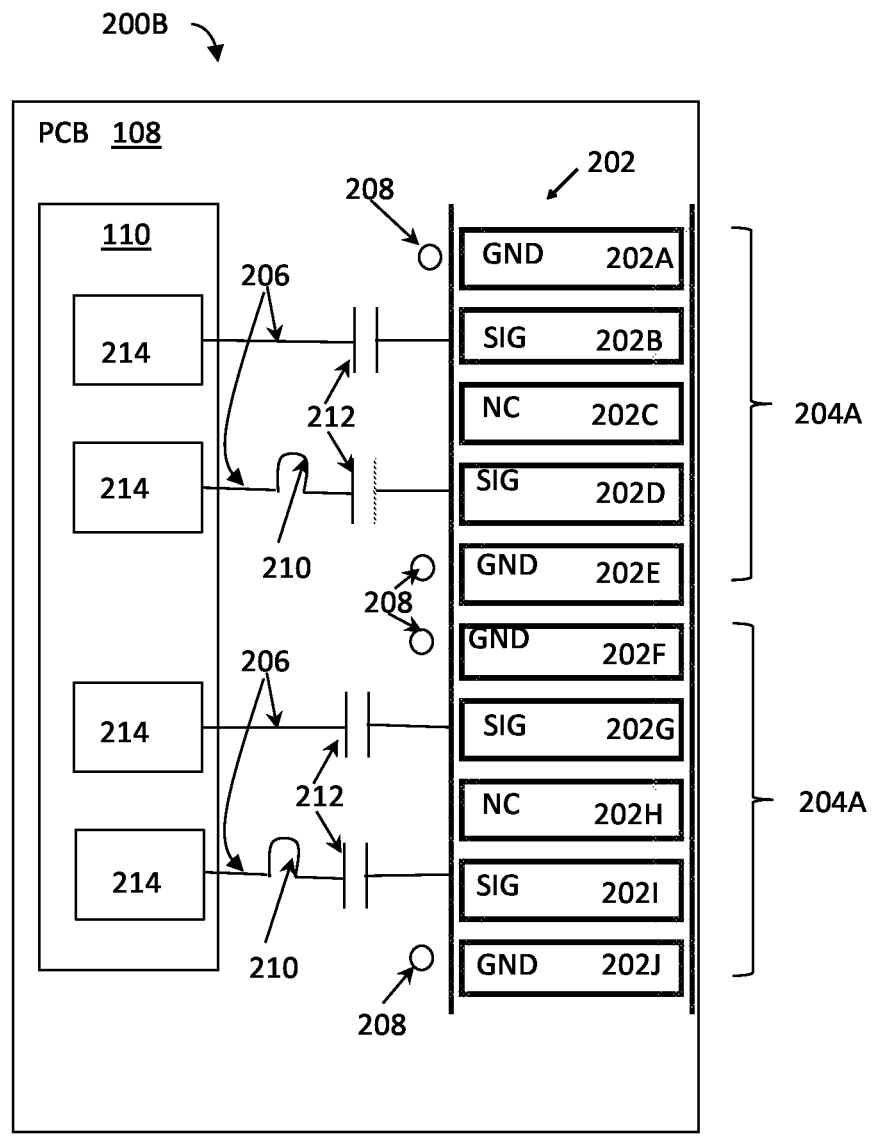
FIGS. 2A and 2B illustrate example pinouts that may be implemented in the connector of FIGS. 1A and 1B.
Figure 2B:
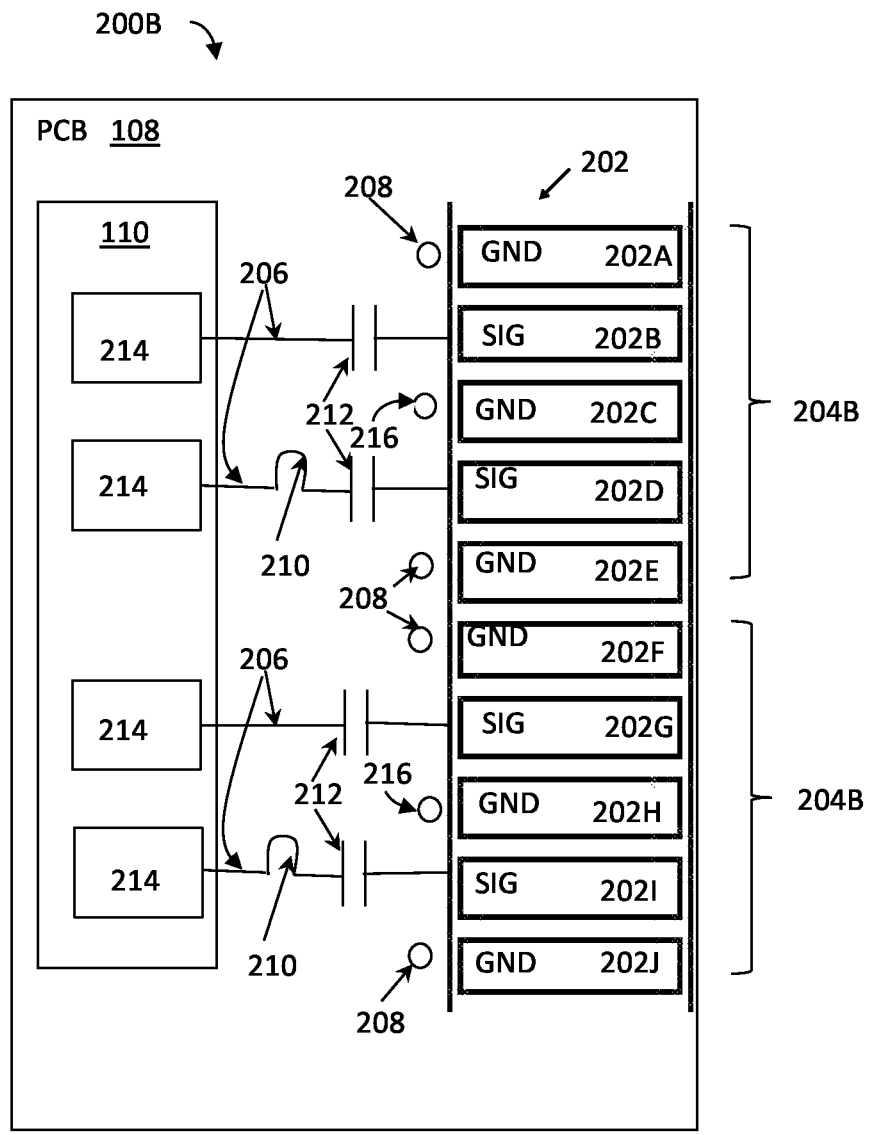

FIGS. 2A and 2B illustrate example pinouts 200A and 200B that may be implemented in the connector 100 of FIGS. 1A and 1B for the pins 102. Generally, the pinouts 200A and 200B may enable separation of signal pins while reducing manufacturing costs. FIGS. 2A and 2B describe the pinouts 200A and 200B with reference to a set of contacts 202A-202J (generally contact 202 or contacts 202) that may be formed on the respective PCBs 108 described above with reference to FIGS. 1A and 1B. Each of the contacts 202 may be electrically coupled to a pin such as one of the pins 102 of FIGS. 1A and 1B.

The pinouts 200A and 200B respectively include functional designation cadences 204A and 204B for a first subset of the contacts 202A-202E. The functional designation cadences 204A and 204B are generally repeated for a second subset of the contacts 202F-202J, as well as for subsequent subsets of contacts 202, if any.

With specific reference to FIG. 2A, the functional designation cadence 204A may include a first ground contact which is the function of contacts 202A and 202F, a first signal contact which is the function of contacts 202B and 202G, a no-connect which is the function of the contacts 202C and 202H, a second signal contact which is the function of the contacts 202D and 202I, and a second ground contact which is the function of the contacts 202E and 202J. Each of the ground contacts (e.g., the first ground contact and the second ground contact) is designated as "GND" in FIG. 2A. Each of the signal contacts (e.g., the first signal contacts and the second signal contacts) is designated as "SIG" in FIG. 2A. Each of the no-connects is designated in FIG. 2A as "NC". Alternately or additionally, the first signal contact and the second signal contact within each subset of contacts may be a differential signal pair.

In some embodiments, a pin (such as the pins 102 of FIGS. 1A and 1B) is electrically coupled to each of the contacts 202. Accordingly, in these and other embodiments, the functional designation cadence 204A may include a ground pin, a first signal pin, a no-connect pin, a second signal pin, and a second ground pin arranged in sequence. Alternatively, the no-connects (e.g., contacts 202C and 202H) may not be coupled to a pin. Accordingly, in these and other embodiments, the functional designation cadence 204 may include a first ground pin, a first signal pin, a second signal pin, and a second ground pin arranged in sequence.

Alternatively, with specific reference to FIG. 2B, the functional designation cadence 204B may include a first ground contact which is the function of contacts 202A and 202F, a first signal contact which is the function of contacts 202B and 202G, a third ground contact which is the function of the contacts 202C and 202H, a second signal contact which is the function of the contacts 202D and 202I, and a second ground contact which is the function of the contacts 202E and 202J. Each of the ground contacts (e.g., the first ground contact, the second ground contact, and the third ground contact) is designated as "GND" in FIG. 2B. Each of the signal contacts (e.g., the first signal contact and the second signal contacts) is designated as "SIG" in FIG. 2B. Alternately or additionally, the first signal contact and the second signal contact within each subset of contacts may be a differential signal pair.

In some embodiments, a pin (such as the pins 102 of FIGS. 1A and 1B) is electrically coupled to each of the contacts 202. Accordingly, in these and other embodiments, the functional designation cadence 204B may include a ground pin, a first signal pin, a third ground pin, a second signal pin, and a second ground pin arranged in sequence. Alternatively, the third ground contact (e.g., contacts 202C and 202H) may not be coupled to a pin. Accordingly, in these and other embodiments, the functional designation cadence 204 may include a first ground pin, a first signal pin, a second signal pin, and a second ground pin arranged in sequence.

Referring again to both FIGS. 2A and 2B, the PCB 108 includes multiple electrical traces 206. The electrical traces 206 electrically couple optical components 214 to the signal contacts 202B, 202D, 202G, and 202I such that electrical signals may be communicated along the electrical traces 206. Although not shown, one or more circuits may be positioned between each optical component 214 and corresponding signal contact 202B, 202D, 202G, and 202I, such as a laser driver when the corresponding optical component 214 includes an optical transmitter or a post-amplifier (PA) when the corresponding optical component 214 includes an optical receiver. As mentioned above, the optical components 214 may be positioned within and/or under the lens assembly 110 described with respect to FIGS. 1A and 1B.

Included on the electrical traces 206 may be a coupling capacitor 212 and/or a loop 210. The coupling capacitors 212 and the loops 210 may match lengths or establish capacitance, impedance, or inductance of the electrical traces 206. The PCB 108 may also include one or more vias 208. The vias 208 may couple the first and the second ground contacts 202A, 202E, 202F, and 202J to an electrical ground within the PCB 108. In the embodiment depicted in FIG. 2A, the "no connect" contact is not connected to the PCB 108 and accordingly, no electrical trace 206 or via 208 is coupled thereto. In contrast, in the embodiment of FIG. 2B, a ground coupling 216 connects the third ground contact (e.g., contacts 202C and 202H) to the electrical ground. In some embodiments, the ground coupling 216 may include a via substantially similar to the vias 208, for instance. As illustrated in FIGS. 2A and 2B, the PCB 108 may repeat the electrical traces 206, the coupling capacitors 212, the loop 210, the vias 210, and the ground coupling 216 for each of the functional designation cadences 204A and 204B.

Separating the first signal contacts 202B and 202G from the second signal contacts 202D and 202I with the no-connect contacts or with the third ground contacts 202C and 202H may maintain an impedance between the first signal contacts 202B and 202G and the second signal contacts 202D and 202I. For example, the impedance may be maintained at 100 Ohms or other suitable impedance. Alternately or additionally, grounding the ground contacts 202C and 202H positioned between the signal contacts 202B, 202D, 202G, 202I may improve signal integrity of data communicated over the signal contacts 202B, 202D, 202G, and 202I.

In some embodiments, the no-connect or the third ground contacts 202C and 202H may have some functional use. For example, a pin coupled to the no-connect or the third ground contacts 202C and 202H may be used during active alignment. During active alignment, the no-connect or the third ground contacts 202C and 202H may act as a direct current output from an integrated circuit included in a connector, such as the connector 100 of FIGS. 1A and 1B. Alternately or additionally, including the pin coupled to the no-connect or the third ground contacts 202C and 202H may slightly (e.g., at least partially) couple the first signal contacts 202B and 202G to the second signal contacts 202D and 202I. Thus, some benefits to the communication of data may be derived by having the pin coupled to the no-connect or the third ground contacts 202C and 202H which is positioned between the pins coupled to the first signal contacts 202B and 202G and the second signal contacts 202D and 202I.

Figure 3A:
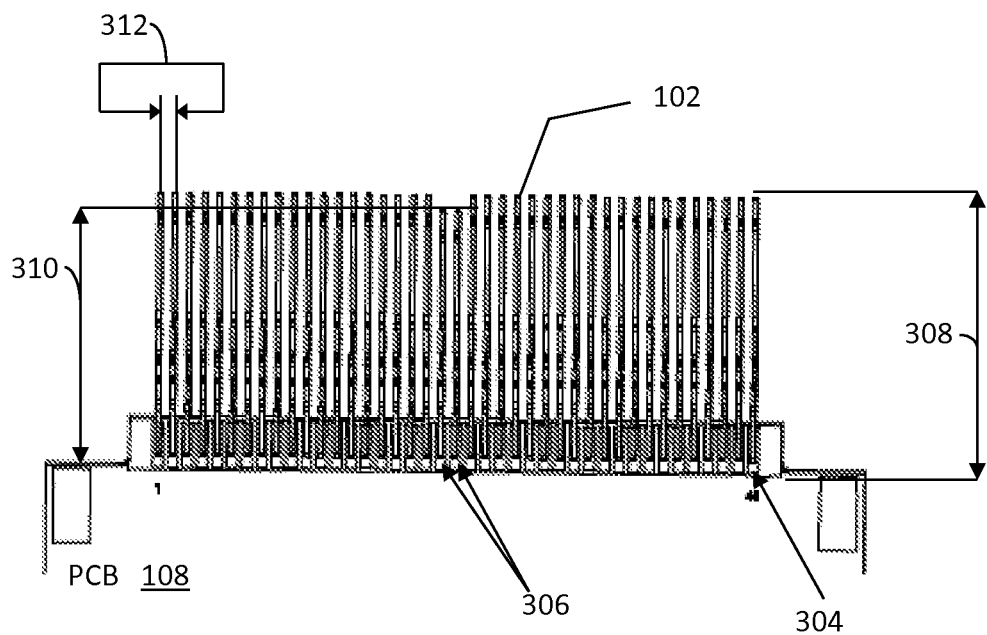
FIGS. 3A and 3B illustrate example pins that may be implemented in the connector of FIGS. 1A and 1B.
Figure 3B:
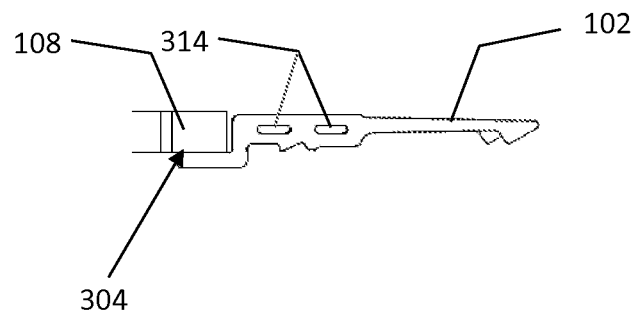

FIGS. 3A and 3B illustrate some additional details of an example arrangement of the pins 102 that may be implemented in the connector 100 of FIGS. 1A and 1B. FIG. 3A depicts a top view of the pins 102 and FIG. 3B depicts a side view of the pins 102. Generally, the pins 102 are coupled to the PCB 108 described above at a set of contacts 304. The contacts 304 are substantially similar to and may correspond to the contacts 202 described with reference to FIGS. 2A and 2B. For example, the contacts 304 may be arranged and configured according to the functional designation cadence 204A or 204B of FIGS. 2A and 2B.

The pins 102 generally include and/or may be arranged according to one of the pinouts 200A and 200B described with respect to FIGS. 2A and 2B. The pins 102 may additionally include two power pins 306. For example, the embodiment shown in FIGS. 3A and 3B includes forty-one pins 102 that may be numbered one through forty-one. In the example embodiments including forty-one pins, the functional designation cadence 204B or 204A respectively including a first ground pin, a first signal pin, a third ground pin, a second signal pin, and a second ground pin or including a first ground pin, a first signal pin, a no contact pin, a second signal pin, and a second ground pin may be repeated multiple times. For example, the functional designation cadence may be repeated six times.

Referring back to FIGS. 3A and 3B, the pins 102 may have two or more lengths 308 and 310. In this and other embodiments, the power pins 306 have a first length 310 that is less than a second length 308 of the remaining pins 102. The relatively shorter first length 310 of the power pins 306 may ensure that when the connector 100 is introduced into a corresponding host connector, the power pins 306 do not make contact with corresponding pins of the host connector until after the other pins 102 (including the ground pins). This may ensure that ground pins are grounded prior to providing power, which may reduce the occurrence of reversed biased diodes, etc.

Additionally, with specific reference to FIG. 3A, the pins 102 and 306 may be separated by a pitch 312. The pitch 312 generally refers to the center-to-center spacing or distance between adjacent ones of the pins 102 and 306. In this and other embodiments, the pitch 312 is constant. For example, the pins 102 and 306 may be spaced at a pitch of 0.5 millimeters (mm). By keeping the pitch 312 constant, a connector including the PCB 108 and the pins 102 may be more easily manufactured.

In an alternative embodiment, the pitch 312 may be constant (e.g. 0.5 mm) but the pins 102 may not be coupled to no-connect contacts or the third ground pins. In these alternative embodiments, the first signal pin, which is positioned between the first ground pin and the second signal pin, may be separated from the first ground pin by the pitch and may be separated from the second signal pin by two times the pitch. In addition, the second signal pin is positioned between the first signal pin and the second ground pin, the second signal pin being separated from the second ground pin by the pitch.

With specific reference to FIG. 3B, the pins 102 may define one or more openings 314. Because capacitance varies based on surface area, defining the openings 314 may result in a reduction in parasitic capacitance imposed by the pins 102. In the depicted embodiment, the openings 314 are substantially oval in shape and there are two openings 314 defined in each of the pins 102. However, this is not meant to be limiting. In some embodiments, the pins 102 may include one or three or more openings 314 that may have any suitable shape.

Figure 4:
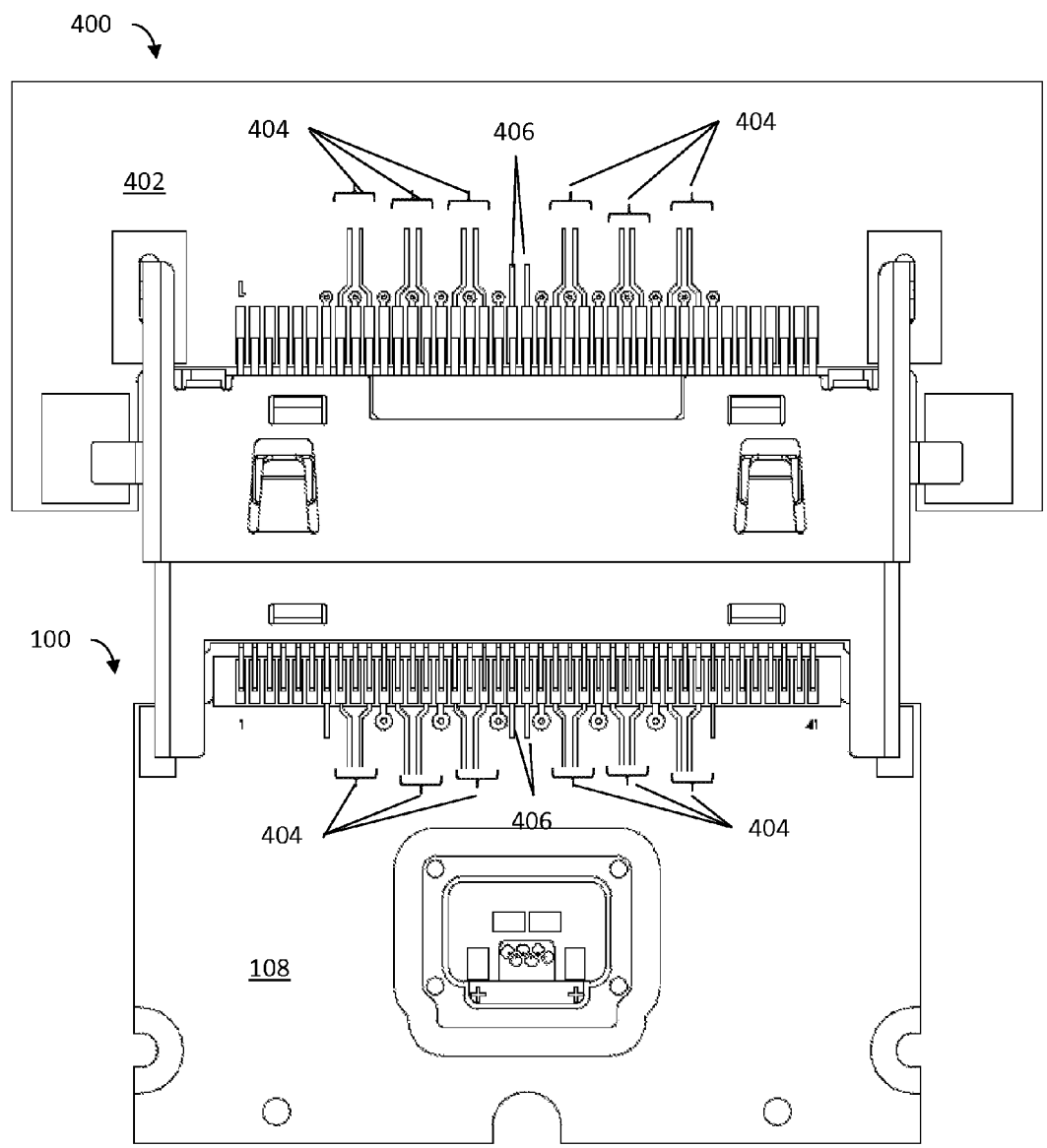
FIG. 4 illustrates an example forty-one pin host connector coupled to the connector of FIGS. 1A and 1B.

FIG. 4 illustrates an example forty-one pin host connector 400 coupled to the connector 100 of FIGS. 1A and 1B. Generally, the connector 100 is received within a corresponding structure of the host connector 400 such that the pins (not shown) of the connector 100 contact a corresponding structure included in the host connector 400. The host connector 400 includes a host PCB 402 which may be similar in at least some respects to the PCB 108 of the connector 100. Specifically, both of the PCB 108 and the host PCB 402 may include electrical traces as described with reference to FIGS. 2A and 2B. Additionally, the host connector 400 includes a complementary pinout to that of the connector 100.

In this and other embodiments, the pinout of the connector 100 and the host connector 400 may include a functional designation cadence 404. The functional designation cadence 404 may be substantially equivalent to either of the functional designation cadences 204A or 204B described with reference to FIGS. 2A and 2B. Specifically, the functional designation cadence 404 may include a first ground pin, a first signal pin, a third ground pin, a second signal pin, and a second ground pin—similar to the functional designation cadence 204B of FIG. 2B—or the functional designation cadence 404 may include a first ground pin, a first signal pin, a no-connect pin, a second signal pin, and a second ground pin—similar to the functional designation cadence 204A of FIG. 2A. In the connector 100, the functional designation cadence 404 may be repeated six times. Likewise, in the pinout of the host connector 400, the functional designation cadence 404 may be repeated six times. Additionally, the pinout of the connector 100 and the host connector 400 includes two power pins 406. The power pins 406 are located in the center two pins of the pinout. Whereas the host connector 400 may include 41 pins and the connector 100 may include 41 pins, and whereas 30 of the pins of each may be used in the six repeating subsets of the functional design cadence 404, and whereas 2 of the pins of each may be implemented as the power pins 406, 9 pins may remain for each. The 9 remaining pins may be used for a two-wire interface between the host connector 400 and the connector 100 and/or for other purposes.

The depicted embodiment of FIG. 4 may be implemented in a system driving six optical components. For example, each of the functional designation cadences 404 may be configured to communicate high-speed differential electrical signals to or from a corresponding one of the six optical components.

Embodiments described herein may be implemented in active cable devices that include an optical cable with one or more optical fibers and an optoelectronic connector at each end of the optical cable. The optical cable with one or more optical fibers may include or correspond to the optical cable with optical fibers 104 illustrated in and described with respect to FIGS. 1A and 1B. The optoelectronic connectors, one at each end, may include or correspond to the connector 100 described herein.

The present invention may be embodied in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A connector comprising:
a plurality of pins having a pinout including at least one functional designation cadence including:
a first ground pin, a first signal pin, a no-connect pin, a second signal pin, and a second ground pin, wherein the first signal pin is positioned between the first ground pin and the no-connect pin, the no-connect pin is positioned between the first signal pin and the second signal pin, and the second signal pin is positioned between the no-connect pin and the second ground pin; or
a first ground pin, a first signal pin, a third ground pin, a second signal pin, and a second ground pin, wherein the first signal pin is positioned between the first ground pin and the third ground pin, the third ground pin is positioned between the first signal pin and the second signal pin, and the second signal pin is positioned between the third ground pin and the second ground pin.

2. The connector of claim 1, wherein the functional designation cadence is repeated at least two times in the pinout.

3. The connector of claim 1, wherein the first signal pin and the second signal are configured to carry a differential electrical signal having a data rate of about 10 gigabits/second or higher.

4. The connector of claim 1, wherein the no-connect pin or the third ground pin is used during active alignment as a direct current output from an integrated circuit included in the connector.

5. The connector of claim 1, further comprising six optical components, wherein the plurality of pins comprises forty-one pins, the forty-one pins including the functional designation cadence repeated six times for six corresponding subsets of pins, each of the six corresponding subsets of pins configured to communicate a high-speed differential electrical signal to or from a corresponding one of the six optical components.

6. The connector of claim 1, wherein at least one of the plurality of pins includes an opening formed therein.

7. The connector of claim 1, wherein the plurality of pins comprises at least one power pin having a length that is less than a length of other pins of the plurality of pins.

8. The connector of claim 1, wherein an impedance between the first signal pin and the second signal pin is about 100 ohms.

9. The connector of claim 1, wherein the plurality of pins have a constant pitch of about 0.5 millimeters.

10. The connector of claim 1, further comprising a metallic electromagnetic radiation shield that at least partially surrounds the plurality of pins.

11. The connector of claim 1, further comprising a printed circuit board that includes a plurality of contacts to which the plurality of pins are electrically coupled.

12. The connector of claim 11, wherein the printed circuit board comprises a first via coupling the first ground pin to an electrical ground and a second via coupling the second ground pin to the electrical ground.

13. The connector of claim 12, wherein the printed circuit board further comprises a first signal trace that couples the first signal pin to a first optical component and a second signal trace that couples the second signal pin to a second optical component.

14. A connector comprising:
a plurality of pins having a pinout including at least one functional designation cadence including a first ground pin, a first signal pin, a second signal pin, and a second ground pin, wherein:
  the first signal pin is positioned between the first ground pin and the second signal pin;
  the first signal pin is separated from the first ground pin by a pitch;
  the first signal pin is separated from the second signal pin by two times the pitch;
  the second signal pin is positioned between the first signal pin and the second ground pin; and
  the second signal pin is separated from the second ground pin by the pitch;
a printed circuit board (PCB) including a plurality of contacts electrically coupled to the plurality of pins and having a PCB contact pinout including a PCB contact functional designation cadence corresponding to the at least one functional designation cadence, wherein the PCB contact functional designation cadence includes a first ground contact, a first signal contact, a second signal contact, and a second ground contact arranged in sequence according to the functional designation cadence; and
a metallic electromagnetic radiation shield that at least partially surrounds the plurality of pins.

15. An active cable device comprising:
an optical cable having opposing first and second ends and including an optical fiber extending from the first end to the second end; and
an optoelectronic connector coupled to the first end of the optical cable, wherein the optoelectronic connector comprises:
  a connector housing;
  a printed circuit board (PCB) positioned within the connector housing;
  an optical component coupled to the PCB, wherein the optical component is optically coupled to a first end of the optical fiber so as to emit light into or receive light from the optical fiber;
  a plurality of pins having a pinout including at least one functional designation cadence including a first ground pin, a first signal pin, a second signal pin, and a second ground pin, wherein:
    the first ground pin, the first signal pin, the second signal pin, and the second ground pin are arranged in sequence;
    the PCB includes a plurality of contacts arranged in sequence according to the functional designation cadence;
    the plurality of contacts of the PCB include a first ground contact coupled to the first ground pin, a first signal contact coupled to the first signal pin, a second signal contact coupled to the second signal pin, and a second ground contact coupled to the second ground pin; and
    the PCB includes a plurality of traces, including a first trace that electrically couples the first ground contact to the optical component and a second trace that electrically couples the second ground contact to the optical component.

16. The active cable device of claim 15, wherein the at least one functional designation cadence further includes a no-connect pin or a third ground pin positioned between the first signal pin and the second signal pin.

17. The active cable device of claim 15, wherein each of the plurality of pins defines at least two openings.

18. The active cable device of claim 15, wherein:
the plurality of pins include a set of non-power pins and a set of power pins;
each pin in the set of non-power pins extends a first distance from the PCB; and
each pin in the set of power pins extends a second distance from the PCB that is less than the first distance.

19. The active cable device of claim 15, further comprising a lens assembly coupled to the PCB, wherein the optical component is positioned within and/or under the lens assembly.

20. The active cable device of claim 19, further comprising an electromagnetic radiation shield that at least partially surrounds the plurality of pins, wherein the electromagnetic radiation shield and the connector housing cooperate to enclose and protect the PCB, the optical component, the plurality of pins, and the lens assembly.

* * * * *